United States Patent [19]

Mueller

[11] 4,359,985
[45] Nov. 23, 1982

[54] GOVERNOR WEIGHT RETAINER ASSEMBLY FOR FUEL PUMP

[76] Inventor: Otto Mueller, 13 Byfield La., Dearborn, Mich. 48120

[21] Appl. No.: 227,684

[22] Filed: Jan. 23, 1981

[51] Int. Cl.³ .............................................. F16D 3/14
[52] U.S. Cl. ...................................... 123/373; 464/3; 464/69; 464/77; 464/84
[58] Field of Search ................... 123/373, 364; 464/3, 464/5, 6, 69, 77, 81, 84

[56] References Cited

U.S. PATENT DOCUMENTS

| | | | |
|---|---|---|---|
| 1,646,772 | 10/1927 | Sheppy | 464/81 X |
| 2,334,877 | 11/1943 | Johnson | 464/77 |
| 3,024,627 | 3/1962 | Karas | 464/81 X |
| 3,339,596 | 9/1967 | Deelman | 464/84 X |
| 3,841,111 | 10/1974 | Staudt et al. | 464/3 |

Primary Examiner—Tony M. Argenbright
Attorney, Agent, or Firm—Olsen and Stephenson

[57] ABSTRACT

A governor weight retainer assembly for a fuel pump in which a flexible connection is provided between the governor weight retainer and the hub on which the weight retainer is mounted. The flexible connection is a mechanical construction which has elongated spring elements supported on the hub as chordal elements, and roller elements are mounted on the weight retainer for limited travel in a circle on the chordal elements. The roller and chordal elements thus serve as cushion means between the retainer and hub.

10 Claims, 6 Drawing Figures

GOVERNOR WEIGHT RETAINER ASSEMBLY FOR FUEL PUMP

BACKGROUND OF THE INVENTION

The present invention relates to fuel pumps of the type adapted to be utilized with internal combustion engines. In particular, the invention is directed to fuel pump governors, and especially to a flexible governor drive which allows for smoother governor operation.

It is known in the art to provide a pump governor to maintain the desired engine speed within the operating range under various load settings. Pumps of this type can be seen, for example, in U.S. Pat. Nos. 3,247,799 and 3,288,124. In mechanical governors such as these, governor weights acting against a governor thrust sleeve rotate a metering valve by means of a governor linkage to vary the setting of the metering valve. The governor weights are pivotally retained in an annular weight retainer member which in turn is mounted on a hub member for rotation therewith. The hub member is mounted on the pump rotor.

In an effort to absorb torsional loading and vibrations transmitted to the pump from the engine as well as those created within the pump itself, it is known to provide a flexible thermoplastic retaining ring which connects the governor weight retainer member to the hub member. The intended purpose of such a retaining ring is to provide smooth governor operations, but the prior art units have failed to provide satisfactory results. The smoothness of operation desired has not been realized and frequently the thermoplastic retaining rings have ruptured or deteriorated causing complete pump failure or extremely irregular engine operation.

Use of mechanical assemblies containing resilient elements, such as coil springs, in place of the thermoplastic retaining rings for providing a flexible connection between the weight retainer member and the hub member have been attempted but without achieving the desired results.

SUMMARY OF THE INVENTION

The present invention has overcome the inadequacies of the prior art and provides an improved governor weight retainer assembly that has a flexible governor drive that meets the needs of the automotive industry.

According to a preferred form of the present invention, a fuel pump governor is provided that has an annular weight retainer, a hub member, and a flexible connection between the members, the flexible connection comprising a pair of elongated wire spring elements mounted at their opposite ends on the hub member, the spring elements being mounted as chordal spring elements diametrically opposite of each other on the hub member, and two pairs of follower elements are mounted on the weight retainer member at locations wherein one pair can travel in spaced relation on one chordal spring element and the other pair can travel in spaced relation on the other chordal spring element for limited distances in response to relative turning of the annular weight retainer member with respect to the hub member. Because the follower elements can only travel in a circle around the axis of the weight retainer and hub members, the chordal wire spring elements will be tensioned on movement of the follower elements thereon and will react to return the follower elements toward their initial positions before the movement occurred. Thus, the flexible connection provides a cushion between the annular weight retainer and the hub member to absorb torsional loads and vibrations.

In the preferred form of the invention, the hub member has a cylindrical wall portion positioned radially inwardly of the chordal spring elements, and the cylindrical wall portion has a circumferentially extending groove therein. The hub member has pins on which the opposite ends of the chordal spring elements are mounted, the opposite ends of the chordal spring elements having return bent loop portions, and the terminal ends are confined in the groove. Also, the chordal spring elements have their longitudinal midportions confined in the groove. By virtue of this construction and arrangement, the weight retainer member can quickly and easily be assembled in place on the hub member and the spring elements can be snap fitted into place to hold these components together. Also, the location of the terminal ends and the midportions of the springs in the groove will serve to retain the two members in proper axial alignment and will prevent displacement of the spring elements.

Also in the preferred embodiment of the invention, follower elements are constructed in the form of rollers that are rotatably mounted on the weight retainer member at locations adjacent to the pins, and the rollers can travel on the radially outer sides of the chordal spring elements, thereby providing smooth travel on the springs and assuring that when relative rotation between the two members occurs, a uniform and progressively increasing tensioning of the spring elements will exert a reverse force progressively increasing on the rollers to urge them back to their normal resting positions whenever the relative rotational displacement between the two members occurs.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIGS. 3, 4, 5 and 6 are enlarged sections taken respectively on the lines 3—3, 4—4, 5—5 and 6—6 in FIG. 2.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
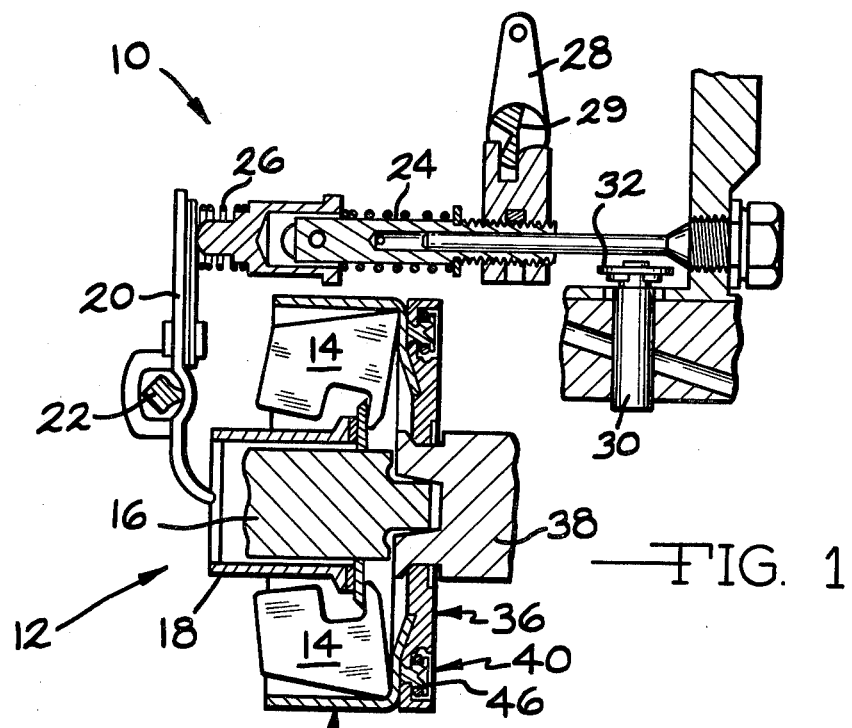
FIG. 1 is a fragmentary schematic illustration of a portion of a fuel injection pump control system, showing in longitudinal section a governor containing the present invention.

Referring now to the drawings, the invention will be described in greater detail. The fuel pump 10 is of the type adapted to supply measured charges of fuel to the fuel nozzles of an internal combustion engine. A governor generally shown at 12, comprises a plurality of flyweights 14 angularly spaced about the pump drive shaft 16 which, under the influence of centrifugal force, urge a sleeve 18 to pivot a governor plate 20 clockwise, as seen in FIG. 1, about a supporting rod 22. The governor plate 20 is urged in the opposite pivotal direction by compression springs 24 and 26, the bias of the latter being variable as controlled by the arm 28 to which the engine throttle lever 29 may be suitably connected. The governor plate 20 is connected for controlling the angular position of the metering valve 30 by a control arm 32 fixed to the metering valve and a link (not shown) connecting the control arm 32 and the governor plate 20. These features are conventional in the art and for a more detailed description thereof reference is made to the United States patents cited above.

The fuel pump governor 12 embodying the present invention is shown in FIG. 1 to have an annular weight retaining member 34, a hub member 36 that is mounted on the pump rotor 38 and a flexible connection, indicated generally at 40, that provides a mounting for the annular weight retainer member 34 on the hub member 36.

Figure 2:
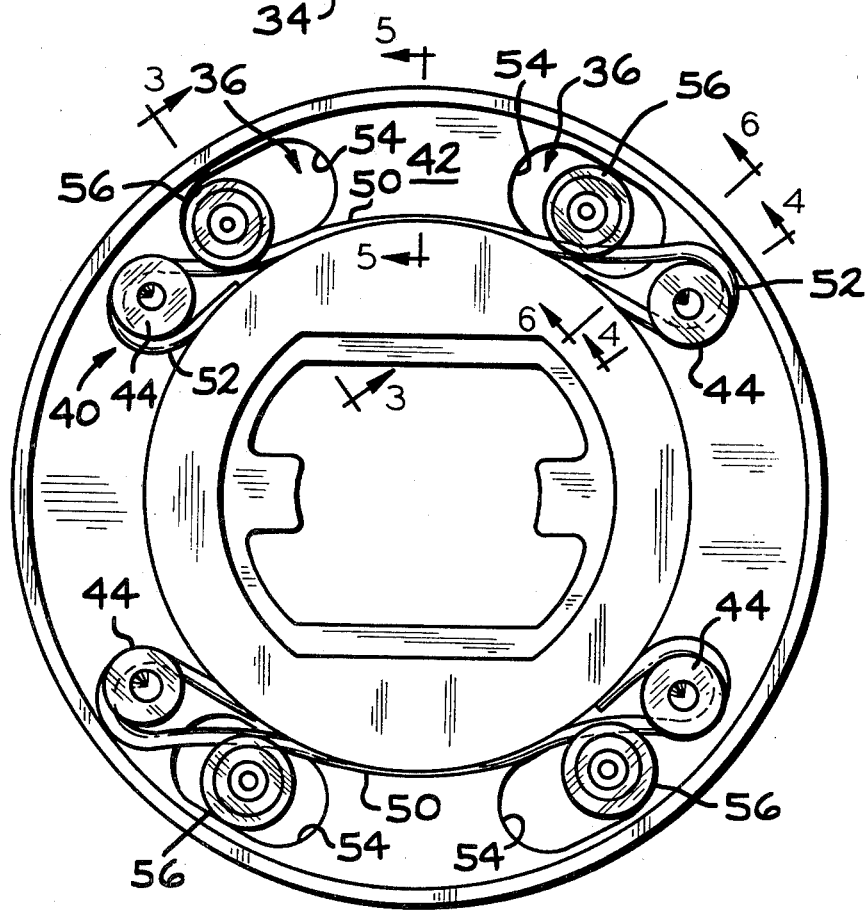
FIG. 2 is an enlarged end elevation, as viewed from the right in FIG. 1, showing the annular weight retainer, the hub member and the flexible connection embodying the present invention.
Figure 3:
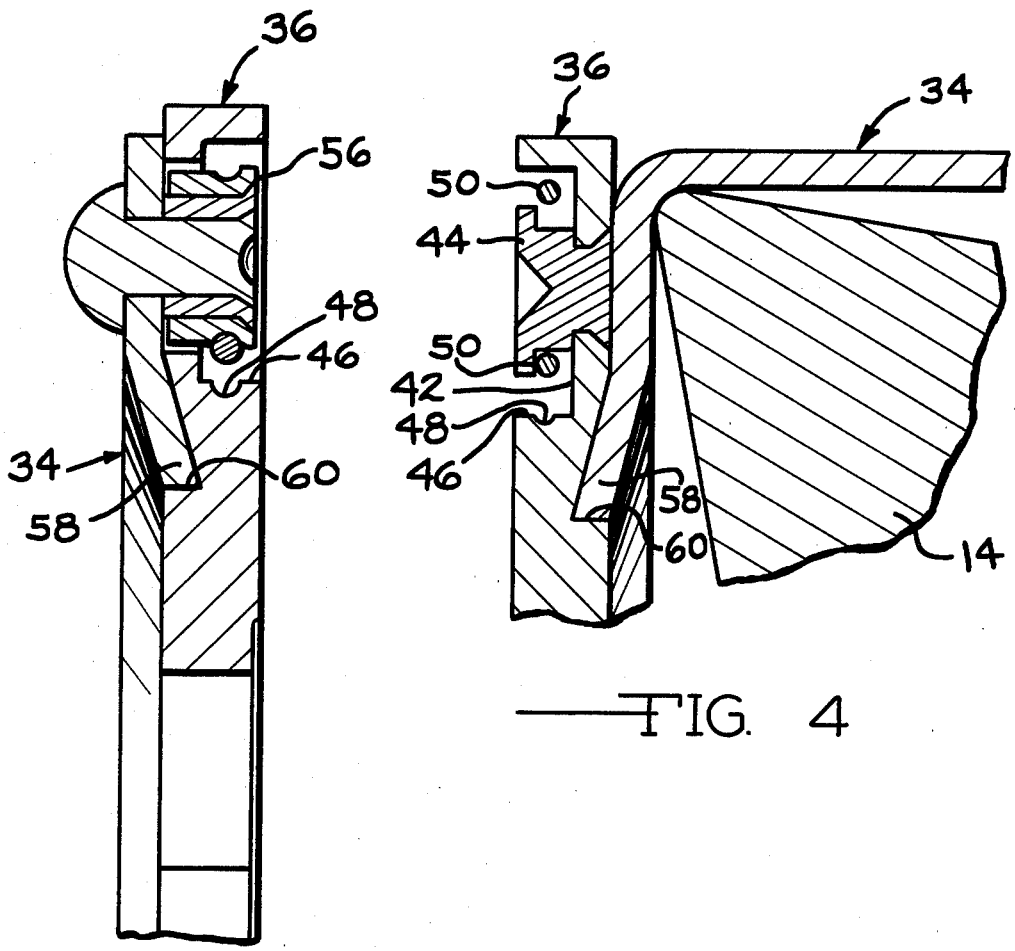
Figure 5:
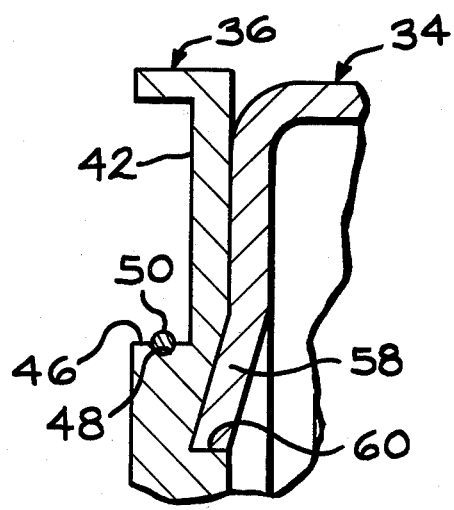
Figure 6:
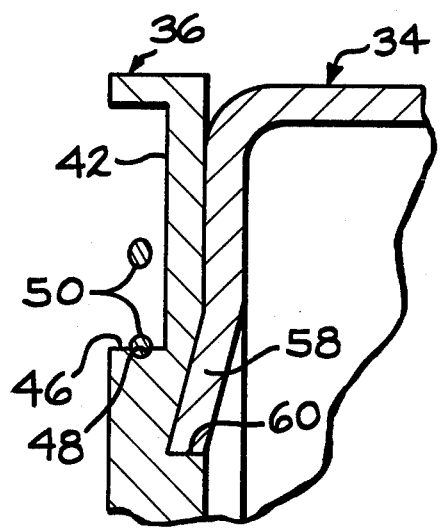

The hub member 36 has a radial wall portion 42 on which a plurality of pins 44 are mounted in fixed positions, and the hub member 36 has a cylindrical wall portion 46 adjacent to the radial wall portion 42 in which a circumferential groove 48 extends. Mounted on one pair of pins 44 is a wire spring element 50 that has its ends shaped to define return-bent loop portions 52. In its low-stress condition the elongated wire spring element 50 is located as a chord on the circular hub member 36, and it is snap-fitted, in effect, on the pins 44 with the terminal ends of the loop portions 52 and the longitudinal midportion in the circumferential groove 48. Thus, the chordal spring element 50 is retained against axial displacement on the hub member 36. Also, the pins 44 included the second pair of pins which also support a second chordal spring element 50 diametrically opposite from the first chordal spring element 50, as seen best in FIG. 2.

The radial wall portion 42 also has a plurality of circumferentially slotted portions 54, some of which are located circumferentially between one pair of pins 44 and the others between the other pair of pins 44. Follower elements or rollers 56 are mounted on the annular weight retainer member 34 and extend through the slotted portions 54 for travel on the chordal spring elements 50 at locations adjacent to the pins 44. The rollers 56 are located with their axes radially outward of the chordal spring elements 50. By virtue of this arrangement, when relative rotation occurs between the weight retainer member 34 and the hub member 36, which can occur by circumferential movement of the weight retainer member 34 at its inner flange 58 in the annular notch 60 of hub member 36, certain of the rollers 56 will roll on the chordal wire elements 50 toward their adjacent pins 44 and the other rollers 56 will roll away from their adjacent pins 44. This can be seen in FIG. 2 wherein the upper left and lower right rollers 56 have moved toward their pins 44 and the opposite situation has occurred with respect to the rollers 56 at the upper right and lower left. Since the rollers 56 must travel in a circle, those approaching their adjacent pin will tension the chordal spring elements 50 so as to create an opposite reaction force which will urge the rollers 56 back toward their more central or neutral positions.

Thus, the construction and arrangement disclosed will assure that a suitable flexible drive connection 40 exists between the governor weight retainer member 34 and the hub member 36 which serves as a cushion between these members. It will absorb torsional loading and vibrations transmitted to the pump 10 from the engine as well as those created within the pump itself. In doing so, it allows for smoother governor operation under various speed conditions and reduces wear of pump and governor parts.

What is claimed:

1. A fuel pump governor having an annular weight retainer member, a hub member, and a flexible connection between the members, characterized in that said flexible connection comprises an elongated wire spring element mounted at its opposite ends as a chord on one of said members, and a follower element mounted on the other member for limited travel on said spring element in response to relative rotation between said members, said follower element and the associated chordal spring element being arranged so that as the follower element moves on the spring element in one circumferential direction the spring element will bias the follower element in the other circumferential direction.

2. A fuel pump governor according to claim 1, characterized in that two follower elements are mounted on said other member for travel on said spring element, one follower element being located adjacent to one opposite end of said chordal spring element and the other follower element being located adjacent to the other opposite end of said chordal spring element.

3. A fuel pump governor according to claim 2, characterized in that said flexible connection includes two chordal spring elements mounted on diametrically opposite sides of said one member, and two follower elements are mounted for travel on each spring element.

4. A fuel pump governor according to claim 1, characterized in that pins are fixed on said hub member, said wire spring element is mounted at its opposite ends on said pins, and said follower element is a roller mounted on said weight retainer member for rolling on said chordal spring element.

5. A fuel pump governor according to claim 4, characterized in that said hub member has a cylindrical wall portion positioned radially inwardly of said wire spring element, said cylindrical wall portion having a circumferential groove therein, and said wire spring element has its longitudinal midportion seated in said groove.

6. A fuel pump governor according to claim 4, characterized in that said hub member has a radial wall portion on which said pins are fixed, said radial wall portion also having a circumferentially slotted portion located circumferentially between said pins, said roller extending through said slotted portion for rolling on said spring element.

7. A fuel pump governor according to claim 4, characterized in that said hub member has a cylindrical wall portion positioned radially inwardly of said wire spring element, said cyclindrical wall portion having a circumferential groove therein, and said wire spring element has at its opposite ends return-bent loop portions, the terminal ends thereof being seated in said circumferential groove.

8. A fuel pump governor having an annular weight retainer, a hub member, and a flexible connection between the members, characterized in that said flexible connection comprises a pair of elongated wire spring elements mounted at their opposite ends on said hub member, said spring elements being mounted as chordal spring elements diametrically opposite of each other on said hub member and two pairs of follower elements mounted on said weight retainer member at locations wherein one pair can travel in spaced relation on one chordal spring element and the other pair can travel in spaced relation on the other chordal spring element for limited distances in response to relative turning of the annular weight retainer member with respect to the hub member so that the flexible connection provides a cushion between the annular weight retainer member and the hub member to absorb torsional loads and vibrations.

9. A fuel pump governor according to claim 8, characterized in that said hub member has a cylindrical wall portion positioned radially inwardly of said chordal spring elements, said cylindrical wall portion having a circumferentially extending groove therein, and said hub member has pins on which the opposite ends of said chordal spring elements are mounted, the opposite ends of the chordal spring elements having return-bent loop portions, the terminal ends of which are confined in said groove, and said chordal spring elements also have their longitudinal midportions confined in said groove.

10. A fuel pump governor according to claim 9, characterized in that said follower elements are rollers that are rotatably mounted on said weight retainer member at locations adjacent to said pins for travel on the radially outer sides of said chordal spring elements, said rollers being mounted for circumferential travel on axes located radially inward of said pins.

* * * * *